G H. CASE.
CONTROLLING SYSTEM FOR FEED MOTORS.
APPLICATION FILED NOV. 6, 1916.
1,386,159.
Patented Aug. 2, 1921.
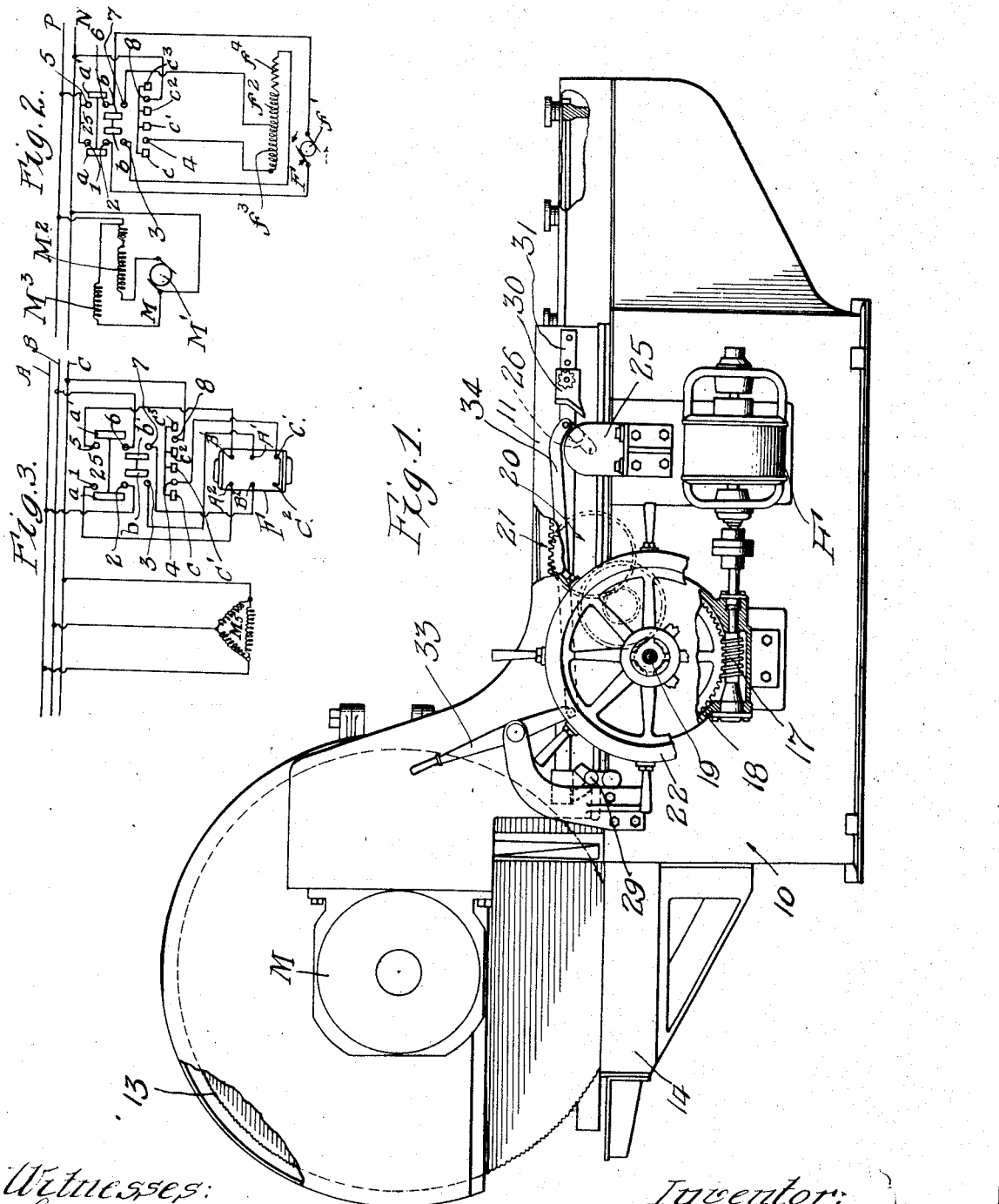

UNITED STATES PATENT OFFICE.

G HARRY CASE, OF PHILADELPHIA, PENNSYLVANIA, ASSIGNOR TO JOSEPH T. RYERSON & SON, OF CHICAGO, ILLINOIS, A CORPORATION OF ILLINOIS.

CONTROLLING SYSTEM FOR FEED-MOTORS.

1,386,159. Specification of Letters Patent. Patented Aug. 2, 1921.

Original application filed October 7, 1914, Serial No. 865,566. Divided and this application filed November 6, 1916. Serial No. 129,768.

*To all whom it may concern:*

Be it known that I, G HARRY CASE, a citizen of the United States, and a resident of Philadelphia, in the county of Philadelphia and State of Pennsylvania, have invented certain new and useful Improvements in Controlling Systems for Feed-Motors; and I do hereby declare that the following is a full, clear, and exact description thereof, reference being had to the accompanying drawings, and to the characters of reference marked thereon, which form a part of this specification.

This invention relates to a novel controlling system for automatically controlling feed mechanism, such as a feed motor for feeding an electrically driven tool (as the friction disk of a friction cutting machine) in such manner that the electric feed is varied inversely to the resistance met by the tool in its passage through the work under varying load values imposed by the work on the tool, so that thereby the resistance to the tool may be maintained at an approximately predetermined value.

My invention has been more particularly designed to meet the feed conditions of friction cutting machines, such, for instance, as the type of machines shown in the prior U. S. Letters Patent to Fergusson, No. 1,004,539, dated September 26, 1911, but may be adapted to other machines where similar tool resisting and feed conditions prevail. The present invention is a division of my prior application for United States Letters Patent Serial Number 865,566, filed October 7, 1914.

In friction cutting machines of the character shown in said Letters Patent and application, for cold metal cutting it is necessary for the operating tool, *i. e.* the friction disk, to be operated at a very high peripheral speed as, for example, from 20,000 to 28,000 feet per minute. It has been demonstrated that if the speed falls substantially below the lower speed mentioned the disk becomes inefficient as a cutting element. Furthermore, it is necessary to vary the speed of the disk toward the work to correspond to the load thrown upon the disk due to the section or hardness of the material operated upon so as not to objectionably overload the electric motor which drives the disk. For example, when operating upon commercial built-up steel columns, beams or girders, the cutting disk is often first directed to the corner or edge of a relatively thin flange of the work and the initial cutting action on the material is usually slow, due to the high speed disk coming in contact with the cold metal. After the metal of the flange ahead of the disk becomes heated the cutting operation becomes more rapid and the work, therefore, presents less resistance to the feed movement of the disk and less load upon the disk driving motor. As the disk continues through the work it encounters the heavier cross section thereof and the resistance to the driving movement of the disk becomes correspondingly greater.

In a friction cold cutting machine of the character described, as well as in other machines having similar tool operating and feeding conditions, it is desirable that the tool operating motor be light and compact, consistent with power to drive the tool against maximum loads and at a predetermined maximum speed for efficient cutting of the metal, and it is necessary also that the tool driving motor be so proportioned to the feed resistance as not to subject said motor to objectionable overloads when the tool is encountering the greatest load values (as when a cutting disk is passing through a large or solid section of the work) such as will tend to injure said driving motor or its circuit. It is also desirable, for efficient operation, that the feed of the tool to the work be increased when the load value decreases (as when the disk is passing through a light section of the work and encounters comparatively little resistance). In other words, the feed factor should be so controlled as to maintain resistance to the cutting action of the tool approximately constant throughout the varying load values due to large and small cross sections of the work.

I have herein shown the elements of a cold friction cutting machine to which my invention may be applied, and various diagrammatic arrangements of the motor controlling circuits for effecting the automatic feed control of the machine, and in the following description specific reference is made to the adaptation of said controlling system to this type of machine.

In the drawings:—

Figure 1 is a partial side elevation and part section of an electrically operated friction cutting machine to which my invention is especially adaptable.

Fig. 2 is a diagrammatic view illustrating my invention as applied to direct current feed motors.

Fig. 3 is a diagram illustrating the adaptation of my invention to alternating current feed motors.

The friction cutting machine shown in Fig. 1 comprises a frame 10, a reciprocating carriage 11 thereon, on the forward end of which is mounted a motor M and direct connected disk 13, said motor constituting the driving or operating motor of the disk. 14 designates a work support beneath the disk at the forward end of the frame.

F designates a feed motor which operates a worm 17 that meshes with a worm gear 18 which is mounted on a horizontal driving shaft 19. Said shaft is connected at its inner end by a train of gears with a pinion 20 which meshes with a rack 21 fixed to the under side of the carriage 11. Through the connections described the carriage and supported cutting disk may be fed toward and retracted from the work. Mounted also on the shaft 19 is a hand wheel 22 which is adapted to act through the rack and pinion mechanism described to feed the disk to the work by hand. The manual feed means is adapted to be operated independently of the power feed means in any suitable manner not necessary to be herein described. So far as the present invention is concerned, it may be assumed that the worm wheel 18 is permanently connected to the shaft 19 so as to be driven by the feed motor F to advance and retract the carriage.

The feed motor is controlled by a switch 25 which embraces as a part thereof a controlling element 26, shown in dotted lines in Fig. 1. The said controlling element is adapted to be engaged by tripping dogs 29, 30 at the forward and rearward limits, respectively, of the travel of the carriage. Said tripping dogs are movably mounted on a bar 31 so as thereby to be adjusted toward and from each other to vary the limit of travel of the carriage in either direction. When the motor controlling system embraces quick return means for rapidly returning the carriage and cutting disk from the work, it is desirable that the front tripping dog be of a swinging type, inasmuch as the quick return speed is such as to effect a considerable drift to the carriage after the power has been shut off. The said motor may be manually started by means of a hand lever 33 located at the front of the machine and connected to the controlling element by a link 34.

The switch 25 is diagrammatically shown in Fig. 2. In practice, this switch is preferably of the rotary or drum type so that a small angular movement of the movable member is sufficient to swing it from one limit to the other of its adjustment. For the purpose of clearly representing the same in a simple diagram, however, the elements of the switch are shown in Fig. 2 as developed in a flat plane. The said switch comprises stationary contacts 1, 2, 3, 4, 5, 6, 7, and 8, and movable switch members $a$, $a'$, $b$, $b'$ and $c$, $c'$, $c^2$, and $c^3$, which latter in the drum type of switch, rotate about the fixed contacts. The movable member $a$ is electrically connected to the member $a'$ and the movable member $b$ is also electrically connected to the member $b''$. The movable members $c$, $c'$, $c^2$ and $c^3$ are all connected together. In the present diagram it will be understood that the movable switch members are all movable in unison in the same direction, and that this movement is represented by right and left horizontal translations from the neutral position shown in Fig. 2. Forward rotation of the feed motor or direction of rotation to feed the disk to the work is obtained by a left hand movement of the movable switch members, and return or reverse movement of the feed motor is obtained by a right hand translation of said switch members.

M' designates the armature of the disk operating motor and $M^2$, $M^3$ the series and shunt fields thereof. While a compound motor is herein shown for driving the disk, it will be understood that any suitable type of driving motor may be employed.

The feed motor, of which $f'$ is the armature, is a direct current series motor, and the series field is split into two parts $f^2$, $f^3$. In series with the armature and field is a resistance element $f^4$. The main lines P, N, respectively, which supply current to the disk operating and feed motors, are connected directly to the fixed contacts 1, 5 and 8, respectively, of the switch.

When the switch is moved to the left from its neutral position, the member $a'$ bridges between the contacts 5 and 6, the member $b$ bridges between contacts 2 and 3 and the members $c'$, $c^3$ engage the contacts 4 and 8, respectively. In this position of the switch current flows from the main line P through switch member $a'$, contact 6, armature $f'$ of the feed motor F, in the direction indicated by the full line arrow, contact 2, switch member $b$, contact 3, and thence through resistance $f^4$ and the motor field and through contact 4, switch members $c'$, $c^3$, and contact 8 back to the return side N of the line.

To reverse the motor, I have chosen to reverse the current through the armature, which is effected by shifting the movable switch members to the right. In this position of the switch current passes from the line P through contact 1, switch member $a$, contact 2, armature $f'$ in the direction indicated by the dotted arrow, contact 6, switch member $b'$, contact 7, and through the portion $f^3$ of the field back to the negative side N of the line through contact 4, switch members $c$, $c^2$ and contact 8. The purpose of splitting the field during the return movement of the disk is to weaken the same and to thereby speed up said feed motor to effect a quick back travel of the carriage and cutting disk. At such time the disk operating motor is running without load and the resistance to movement of the table is comparatively small. The speed of the motor is further increased by reason of the fact that the reverse adjustment of the switch cuts the resistance $f^4$ out of the armature circuit.

In accordance with the phase of my invention relating to automatic regulation of the speed of the feed motor during the forward or cutting stroke of the disk, it is one feature of the invention that the capacity of the feed motor is so proportioned, relatively to the maximum cutting load which the disk may encounter, as to work up from full load to 25 to 50 per-cent. overload when the disk is cutting at its maximum capacity work. Hence, when the machine is cutting below its maximum capacity, as when cutting light or soft sections, the said motor will be working within its limit of normal load and will draw less than its full load current in the armature and the field. This will cause the feed to speed up because of the weakened field. Furthermore, this condition will cause the disk to be advanced more rapidly toward the work and will increase the work on the disk operating motor and maintain it at approximately its full load capacity. Likewise, when the disk operating motor is keeping up to its full load capacity, as when passing through a heavy or hard section of the work, the said feed motor will attempt to maintain its speed, with the result that it draws more current through its armature. At the same time, more current flows through the series field and will strengther it and will cause the speed of the feed to be reduced and thereby reduce the speed of the disk toward the work. Thus the disk is moved at less speed through the work, which permits the disk to be operated at the required peripheral speed and without throwing an objectionable overload on the disk operating motor. It will thus be seen that a small feed motor prevents the main or disk operating motor from overloading itself beyond a predetermined limit, and also maintains the peripheral speed of the disk at an efficient cutting value. It has been found that when operating the saw with a 35 horse power motor running from 1500 to 1800 revolutions per minute and cutting 24 inch I beam sections, a feed motor of three-quarters to one horse power is effective to produce the control described.

In Fig. 3 of the drawings is shown a method of controlling a three phase alternating current feed motor in the same general manner that the direct current motor shown in Fig. 2 is controlled.

As shown in said Fig. 3, $M^5$ designates the disk operating motor and F designates a three phase alternating current feed motor. The same type of switch 25 may be employed with this motor as is used with the direct current motor referred to. In order to obtain rapid return speed of the motor the stator of the motor is wound with two sets of windings, one set being connected up with a given number of poles and another set being connected up with a greater number of poles as, for instance, in the ratio of two poles to six poles.

The automatic regulation of the forward speed of the motor may be obtained by providing the rotor with conducting bars which have greater resistance than normally used in a motor of any given capacity, the high resistance of the said bars having the effect to retard induction and of making the motor sensitive to the varying loads. The air gap between the rotor and stator is also increased so as to increase the magnetic reluctance, or in other words, to increase the slip of the rotor. The action of the rotor is somewhat like the series direct current motor, in that under increasing loads or demands on itself its speed is automatically slowed down and hence protects the disk operating motor by slowing down the rate of feed travel of the disk at a time when the load is heaviest, and correspondingly increases the feed travel as the load on the disk operating motor decreases.

Referring to said Fig. 3, it will be noted that when the movable members of the switch are moved to the left from the neutral position, or to the forward position of the switch, current will pass from phase A through 2, switch member $b$, contact 3 to A', at the stator. Current will pass from phase B through contact 6, switch member $a'$, contact 5 to B' at the stator. Current will pass from phase C through contact 8, switch members $c^3$, $c'$ and contact 4 to C' at the stator. This position of the switch will connect the line to the six pole winding of the stator and gives slow forward speed with automatic regulation.

When the switch is adjusted to the right from the neutral position for the return rotation of the feed motor, current passes from phase A through current 2, switch member $a$ contact 1, to $A^2$ at the stator. Current will pass from phase B through contact 6, switch member $b'$, contact 7 to $B^2$ at the stator. Current will pass from phase C through contact 8, switch members $c^2$, $c$ and contact 4 to $C^2$ at the stator. This adjustment of the switch connects the two pole winding of the stator in the circuit, which is the high speed of quick return speed of the said motor.

It will be obvious that a generally similar method of connecting a two phase motor to the line may be employed, with slight variations in the wiring to correspond with the two phase circuit.

I claim as my invention:—

1. In a system for controlling electrical motors for friction cutting machines, a carriage, a friction cutting disk supported thereon, an electric motor for operating said disk, a second electrical motor for feeding the carriage and disk having a drooping speed torque characteristic whereby the resistance to the disk is maintained at a substantially constant value when the disk is driven through loads of varying values.

2. In a system for controlling electrical motors a cutting device, an operating electric motor therefor, an electric motor for feeding the cutting device against loads of varying values, said latter motor having a drooping speed torque characteristic and being so proportioned that it runs considerably above overload when the cutting disk is operating at its maximum capacity work, whereby the speed of the feed motor varies inversely as the value of the resistance to the cutting device varies.

3. The combination with a cutting tool, means for operating it, reciprocating feed means to bring the tool and work in co-operating cutting relation and an electric motor having a dropping speed torque characteristic to operate the reciprocating feed means, for maintaining the resistance to the cutting tool at a substantial constant value when driven through loads of varying value.

4. The combination with a cutting tool, means for operating it, reciprocating feed means to bring the tool and work in co-operating cutting relation and an electric motor having a drooping speed torque characteristic to operate the reciprocating feed means, for maintaining the resistance to the cutting tool at a substantial constant value when driven through loads of varying value, said motor being so proportioned to the resistance acting against the cutting tool that it runs considerably above overload when the tool is operating at its maximum capacity.

5. In a friction cutting machine, the combination with a rotary saw blade, a motor for driving it, the blade being mounted directly on the motor shaft, and a feed motor for feeding the saw to its work, said feed motor having a drooping speed torque characteristic and being so proportioned in capacity relative to the maximum and minimum loads on the saw driving motor and being connected directly to the feed lines of the saw driving motor outside of the latter motor so that said feed motor works at substantial overloads during the maximum resistance of the saw against the work, whereby the feed motor is responsive to the load on the saw to maintain the resistance of the saw to the work at a substantial constant value when driven against loads of varying values.

In witness whereof I claim the foregoing as my invention I have hereunto affixed my signature in the presence of two witnesses this 9th day of September, 1916.

G HARRY CASE.

Witnesses:
 WILLARD J. DIXON,
 W. L. HALL.